United States Patent [19]

Tai et al.

[11] Patent Number: 5,020,119
[45] Date of Patent: May 28, 1991

[54] SYSTEM FOR PRODUCING SERRATED, ALTERNATING PIXEL PATTERN ON CHARACTER BOUNDARIES

[75] Inventors: Hwai T. Tai, Rochester; John R. Thompson, Webster, both of N.Y.

[73] Assignee: Eastman Kodak Company, Rochester, N.Y.

[21] Appl. No.: 371,896

[22] Filed: Jun. 26, 1989

[51] Int. Cl.$^5$ .......................... G06K 9/38; G09G 1/06; G06F 15/00
[52] U.S. Cl. ........................................ 382/50; 382/53; 358/466; 340/730; 364/519
[58] Field of Search ...................... 382/50, 53; 358/466, 358/461, 429, 465, 458; 364/519; 340/728, 730

[56] References Cited

U.S. PATENT DOCUMENTS

| | | | |
|---|---|---|---|
| 3,973,239 | 8/1976 | Kakumoto | 382/50 |
| 4,251,837 | 2/1981 | Janeway | 382/50 |
| 4,315,285 | 2/1982 | Sommer et al. | 358/466 |
| 4,349,846 | 9/1982 | Sekigawa | 382/50 |
| 4,466,123 | 8/1984 | Arai et al. | 382/55 |
| 4,517,604 | 5/1985 | Lasher et al. | 358/262 |
| 4,525,747 | 6/1985 | Sakai et al. | 358/466 |
| 4,544,264 | 10/1985 | Bassetti et al. | 355/14 R |
| 4,626,922 | 12/1986 | Saitoh | 382/53 |

Primary Examiner—David K. Moore
Assistant Examiner—Michael R. Cammarata
Attorney, Agent, or Firm—Norman Rushefsky

[57] ABSTRACT

An image processing system for converting gray level, digital, pixel information into binary data. Pixels with digital values close to the threshold value are further processed to determine the binary value to be specified for that pixel. In such cases, the adjacent horizontal pixel is tested and, if that test is inconclusive, the adjacent vertical pixel is tested. Depending upon the tests of whether the adjacent pixels were also close to the threshold value, the current pixel value is assigned the opposite value as the previous adjacent pixel. This has the effect of specifying, for transition areas at the boundaries of text characters and graphic lines, alternating pixels which produce a serrated edge along the borders of the character or line. These edges are of high spatial frequency and are substantially undetectable under ordinary circumstances by an observer. These edges are also smoothed in the printing process by the fusing of the toner to the output medium. The invention is also applicable to adding alternating pixel areas to larger areas defined by digital values close to a predetermined threshold value, and enhances the information stored by binary bits for continuous-tone and half-tone pictorial images.

25 Claims, 4 Drawing Sheets

| 207 | 198 | 176 | 212 | 205 | 189 | 197 | 205 | 201 |
|---|---|---|---|---|---|---|---|---|
| 46 | 12 | 15 | 39 | 18 | 6 | 22 | 17 | 5 |

FIG. 12

| 207 | 204 | 193 | 136 | 22 | 4 | 0 | 6 | 144 | 187 | 204 | 202 |
|---|---|---|---|---|---|---|---|---|---|---|---|
| 206 | 201 | 195 | 111 | 34 | 5 | 4 | 15 | 177 | 211 | 212 | 209 |
| 207 | 205 | 198 | 108 | 17 | 11 | 0 | 37 | 151 | 197 | 207 | 203 |
| 204 | 206 | 192 | 115 | 12 | 6 | 0 | 49 | 121 | 202 | 211 | 198 |
| 206 | 203 | 187 | 123 | 9 | 2 | 3 | 16 | 105 | 196 | 199 | 209 |

FIG. 10

| 0 | 0 | 0 | 0 | 0 | 1 | 1 | 1 | 1 | 0 | 0 | 0 | 0 | 0 |
|---|---|---|---|---|---|---|---|---|---|---|---|---|---|
| 0 | 0 | 0 | 0 | 0 | 1 | 1 | 1 | 1 | 1 | 0 | 0 | 0 | 0 |
| 0 | 0 | 0 | 0 | 0 | 1 | 1 | 1 | 1 | 0 | 0 | 0 | 0 | 0 |
| 0 | 0 | 0 | 0 | 0 | 1 | 1 | 1 | 1 | 1 | 0 | 0 | 0 | 0 |
| 0 | 0 | 0 | 0 | 0 | 1 | 1 | 1 | 1 | 0 | 0 | 0 | 0 | 0 |

FIG. 11

| 211 | 198 | 209 | 144 | 137 | 130 | 14 | 0 | 5 |
|---|---|---|---|---|---|---|---|---|
| 214 | 196 | 210 | 151 | 129 | 136 | 26 | 0 | 2 |
| 199 | 201 | 202 | 132 | 150 | 142 | 44 | 7 | 8 |
| 205 | 203 | 196 | 139 | 144 | 134 | 15 | 6 | 1 |
| 207 | 203 | 194 | 143 | 151 | 140 | 4 | 4 | 0 |

FIG. 13

| 0 | 0 | 0 | 0 | 0 | 0 | 0 | 1 | 1 | 1 |
|---|---|---|---|---|---|---|---|---|---|
| 0 | 0 | 0 | 0 | 0 | 0 | 0 | 1 | 0 | 1 |
| 0 | 0 | 0 | 0 | 0 | 0 | 0 | 0 | 1 | 1 |
| 0 | 0 | 0 | 0 | 0 | 0 | 0 | 0 | 1 | 1 |
| 0 | 0 | 0 | 0 | 0 | 0 | 0 | 0 | 1 | 1 |

FIG. 14

SYSTEM FOR PRODUCING SERRATED, ALTERNATING PIXEL PATTERN ON CHARACTER BOUNDARIES

BACKGROUND OF THE INVENTION

1. Field of the Invention

This invention relates, in general, to photocopying and, more specifically, to apparatus which scans documents and converts the scanned signals into binary data.

2. Description of the Prior Art

Electronic copy machines, and other similar devices, can use an electronic scanner to develop digital information relative to the content or image patterns of an original document. Many scanners are capable of scanning the original and providing the output data in a multi-bit digital format. With such data, the gray scale or degree of density of a particular scanned pixel can be represented by the value of the pixel data. Although this form of data is useful in some applications, other applications only need the data in one-bit, two-valued, binary form for each pixel. There can be many reasons for this requirement, including memory conservation, lack of gray scale information in the second document, and the inability of the reproducing apparatus or print engine to produce multi-bit, gray level, image information.

A well known process for converting digital information into binary information involves the use of a threshold level, or value above and below which different binary values are specified. While this type of conversion system is easy to implement, it has certain limitations and drawbacks when used to convert scanned information containing high contrast text characters and graphic lines. These limitations are inherent in the operation of such scanners because of the modulation transfer function (MTF) of the scanner and the inability of the scanning to be exactly in phase with the boundary or borders of the text characters. The result is a void of pixels along the text boundaries, sometimes amounting to several pixels in a row. Because of the large voids or gaps produced along the edges of the characters using this technique, the voids are noticeable and the characters do not appear to have precisely defined shapes. Conventional thresholding also has limitations when processing continuous and halftone pictorial information since much of the medium density data is lost in the conversion process to only two levels.

In order to overcome some of the limitations of the prior art conversion systems, several techniques have been used with differing degrees of success. One system uses what is known as adaptive thresholding wherein the value or level of the threshold changes during the processing, depending upon some function of the values being processed. Other forms of conversion systems known in the prior art use edge enhancing and noise cleaning to reshape the edges of characters. However, these systems require a knowledge of the shape of the characters which the pixels represent. This adds the limitation that this type of processing can only be used for known character shapes. Random shapes or non-standard characters are not easily enhanced using such techniques.

U.S. Pat. No. 4,466,123, issued on Aug. 14, 1984, teaches a processing system for correcting contour line pattern images. In this system, the data being processed is in binary form, and the patent does not disclose any system for purposely introducing an alternating pixel pattern along the edges of the characters, as does the present invention. U.S. Pat. No. 4,517,604, issued on May 14, 1985, teaches a method for reducing line width variations in bilevel video images whereby a gray level pixel or pel is added to the ends of certain lengths of black pixel scans. Unlike the present invention, this patent describes a technique wherein the treatment at the edges of a black line scan is dependent upon the number of black pixels includes in the line scan.

U.S. Pat. No. 4,544,264, issued on Oct. 1, 1985, is another patent which teaches a form of line enhancement which has been described in the prior art but which is different than that disclosed herein. In that patent, a systematic addition or deletion of gray pels or pixels at the end of a scan line is determined by the number of black pels in a row, primarily lines of a single pixel in width. The gray pels are added to make the line thicker and the addition is dependent upon the direction of the scan.

Therefore, it is desirable, and it is an object of this invention, to provide a system for processing digital, gray scale data into binary data which is convenient to implement, and which can be used on ccharacters of unknown format and on images and graphics of other types.

SUMMARY OF THE INVENTION

There is disclosed herein a new and useful system which enhances the shape of text and pictorial information reproduced from binary data which was converted from digital data by this unique system. The digital data inputted from a scanner is converted to binary data by a unique process which effectively alternates adjacent pixels along the edges of text characters and in larger regions which are defined by pixels having digital values close to a threshold value. The system process of this invention looks at the digital value of the pixel being converted and determines whether the value is within a predetermined distance of a threshold value. If it is within this distance, it is determined to be uncertain which binary value should be specified for that pixel. If it is outside the uncertain region, then the normal thresholding, technique of selecting either the binary "1" or "0" for the particular digital value is used.

Within the uncertain area or region of digital values, the processing technique of this invention can look at previous pixels to determine whether or not the binary value assigned to the current pixel will be a binary "1" or "0". The adjacent horizontal pixel is tested first to determine whether it was within the uncertain range. If it was not within the uncertain range, the adjacent vertical pixel is looked at to determine the binary value which will be specified. If the adjacent horizontal pixel was in the uncertain range, then the current pixel is specified with the binary value opposite to that which was specified for the adjacent horizontal pixel. In the case where the adjacent vertical pixel is tested, and the adjacent vertical pixel was in the uncertain range. the binary value opposite to that of the adjacent vertical pixel is specified for the current pixel. In the case where the adjacent vertical pixel was also outside the uncertain range, the current pixel was specified with the binary value determined by a more straight forward thresholding technique which selects a binary "1" or "0" depending on whether the digital value is above or below a predetermined threshold value.

The techniques of this invention purposely introduce a serrated or jagged edge of the text characters and an alternating pixel pattern to larger gaps in the image information. The high spacial frequency of the gaps of the alternating pixels is substantially undetectable by normal visual observation of the outputted character and information, especially after the information has been processed in a print engine which uses toned images which are fused to a hard copy material.

BRIEF DESCRIPTION OF THE DRAWINGS

Further advantages and uses of this invention will become more apparent when considered in view of the following description and drawings, in which.

DESCRIPTION OF THE PREFERRED EMBODIMENTS

Throughout the following description, similar reference characters refer to similar elements or members in all of the figures of the drawings.

Figure 1:
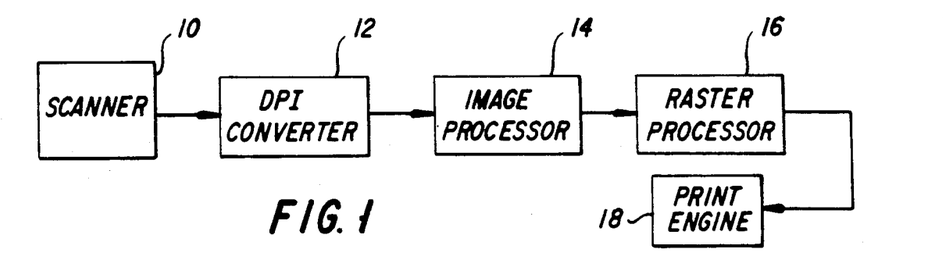
FIG. 1 is a block diagram of a copy machine utilizing the invention.

Referring now to the drawings, and to FIG. 1 in particular, there is shown a block diagram of a copy machine utilizing the present invention. The scanner 10 is used to scan the original document and convert the optical information from the original document to electrical signals. Because some scanners have different resolutions, which can be expressed in dots per inch (dpi), the dpi converter 12 may be used to suitably match the resolution of the scanner with the remainder of the system. The image processor 14 converts the digital, gray scale, information from the scanner 10 and the dpi converter 12 into binary data which is transferred to the raster processor 16 for storage and subsequent transfer to the print engine 18. It is also within the contemplation of the invention that the scanner 10 includes various forms of digitizing video signals which represent information to be processed.

The print engine 18 includes a photosensitive surface (not shown) on which a latent image is developed by toner which is transferred to a hard copy material and fused thereon by a suitable fusing device. Details of the many embodiments of such print engines are well known by those skilled in the art. One of the important aspects of the print engine 18 is the fact that small voids or gaps in the character lines purposely introduced by the image processor 14 are reduced by the characteristics of the print engine, specifically the fusing of the toner which fills in the voids or gaps. It is this characteristic of print engines which is used to an advantage by the image processor 14 to ultimately produce a better quality and more aesthetically pleasing hard copy of the original document than prior art techniques allowed.

Figure 2:
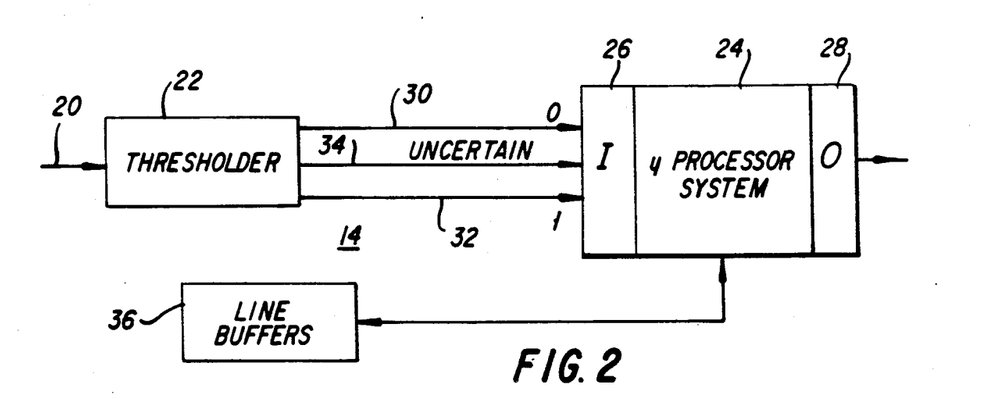
FIG. 2 is a detailed block diagram of the image processor shown in FIG. 1.

FIG. 2 is a detailed block diagram of the signal processor 14 shown in FIG. 1. The multi-bit digital input signal 20 is applied to the thresholder 22, which may consist of a comparator. The output of the thresholder 22 is delivered over three lines to the microprocessor system 24, which includes the input section 26 and the output section 28. Line 30 carries the input information when the digital value of the signal 20 is definitely at a binary value of "0". Conversely, the line 32 carries the information when the input value corresponds to a binary "1". If the input information is uncertain, as will be described in more detail hereafter, line 34 carries such information to the input section 26 of the microprocessor system 24. This information is sent to the system 24 for each pixel being converted. Temporary storage of the processed pixels is provided by the line buffers 36. Ordinarily, the pixel information contained in signal 20 will be derived from line-by-line scanning of the original document. Since each pixel is processed immediately by the system 24, and since the processing depends primarily upon the adjacent pixels, the data in the line buffers 36 provides all of the information about past pixel values needed for making the processing decisions. Output section 28 transfers the processed data to the raster processor 16 shown in FIG. 1.

Figure 3:
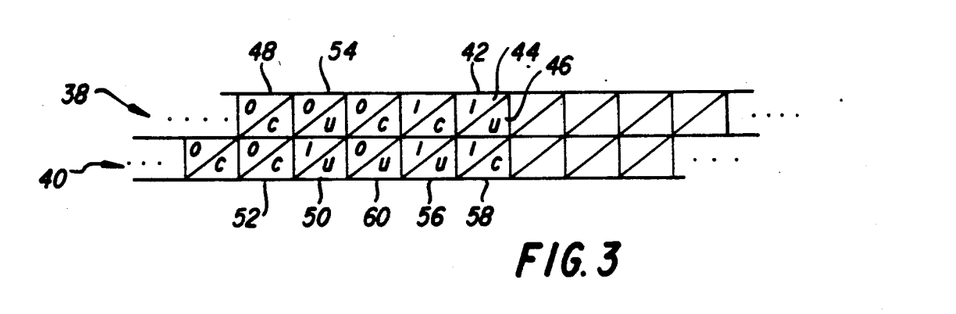
FIG. 3 is a diagram illustrating a function of the processor during a line scan.

FIG. 3 is a diagram illustrating the function of the processor during a line scan. The buffer contains memory for two line scans, with the upper positions 38 corresponding to the previously scanned line, and the lower positions 40 corresponding to the present or currently scanned line. A portion of the pixels corresponding to the line buffers is shown in FIG. 3, with each pixel having two types of information contained therein and shown in FIG. 3 as being either above or below the diagonal going across the pixel location. For example, the pixel 42 contains the binary "1" in section 44 and the uncertain flag "u" shown in section 46. Generally, this indicates that the binary value to which this pixel was converted is a binary "1" and that the original digital value assigned to this pixel had a value which produced an uncertain "u" input to the microprocessor system 24, shown in FIG. 2. The order of scanning occurs from left to right, thereby indicating that pixel 48 was scanned prior to pixel 42 in the example shown in FIG. 3. Of course, all of the pixels in line position 38 were scanned before the pixels were scanned and processed in line position 40.

The indicated values for the pixels shown in FIG. 3 will be used in describing the method by which the system of this invention determines into which binary value to convert the digital values from the scanner. When the system is processing the data to determine which binary value to put in for pixel 50, it has already processed all of the pixels in the above line and all of the pixels of the left of pixel 50. In deciding what value to put into pixel 50, the system first determines whether the digital value assigned to pixel 50 is in the certain or uncertain range. As shown in FIG. 3, the digital data for pixel 50 is in the uncertain range, consequently the "u" is stored below the diagonal in pixel 50. Although letters are used in this illustration, it should be understood that the actual operating hardware would have identifiable bit patterns stored in the buffer memory. Only one bit is needed for this quantity.

Because of the uncertainty of the digital value, the system looks at a previous pixel in deciding what binary value to assign to pixel 50 and to place above the diagonal line therein. Thus, the previous horizontal and adjacent pixel 52 is tested to see what information is available about this pixel. As can be seen, pixel 52 contained "c" (certain) data and a "0" binary value. The system of this invention does not use certain digital values for previous pixels to determine the value to apply to the current pixel. This is because at least two uncertain pixels must be located adjacent to each other to define the border or boundary region of the text. Therefore, pixel 52 does not control the binary value to be selected for pixel 50. The system then looks at the adjacent vertical pixel 54 and applies the same test. Here, the pixel digital data was in the uncertain range and, therefore, the data in pixel 54 will be used to influence or determine the data in pixel 50. According to the basic overall processing technique of this specific embodiment, the binary values of all adjacent and uncertain pixels is alternated. Thus, the "0" binary value for pixel 54 dictates the binary value of "1" in pixel 50. This type of analysis is applied to the remainder of the pixels in the line. Looking back first at the adjacent horizontal pixel and then, if needed, to the adjacent vertical pixel, is accomplished for each of the pixels in the line scan.

Pixels 56 and 58 indicate the binary values produced by this system for other binary values and certainty flags of the previous pixels. As shown in FIG. 3, the digital value corresponding to pixel 56 is in the uncertain "u" range. Therefore, the previous pixel 60 is tested, and it is determined that it also is in the uncertain range. Because it meets the requirement of two adjacent uncertain pixels, the "0" binary value for pixel 60 is controlling for the binary value assigned to pixel 56, with the assignment being made the opposite of the preceding pixel. Thus, a binary "1" is assigned for the binary value of pixel 56. On the other hand, pixel 58 is represented by a certain "c" digital value as indicated. Consequently, the binary values in the adjacent horizontal and vertical pixels have no bearing upon the binary value selected or assigned to the pixel 58. The binary value of "1" is assigned to pixel 58 only because of the digital value for pixel 58 being a certain binary "1" from the threshold circuitry 22.

Figure 4:
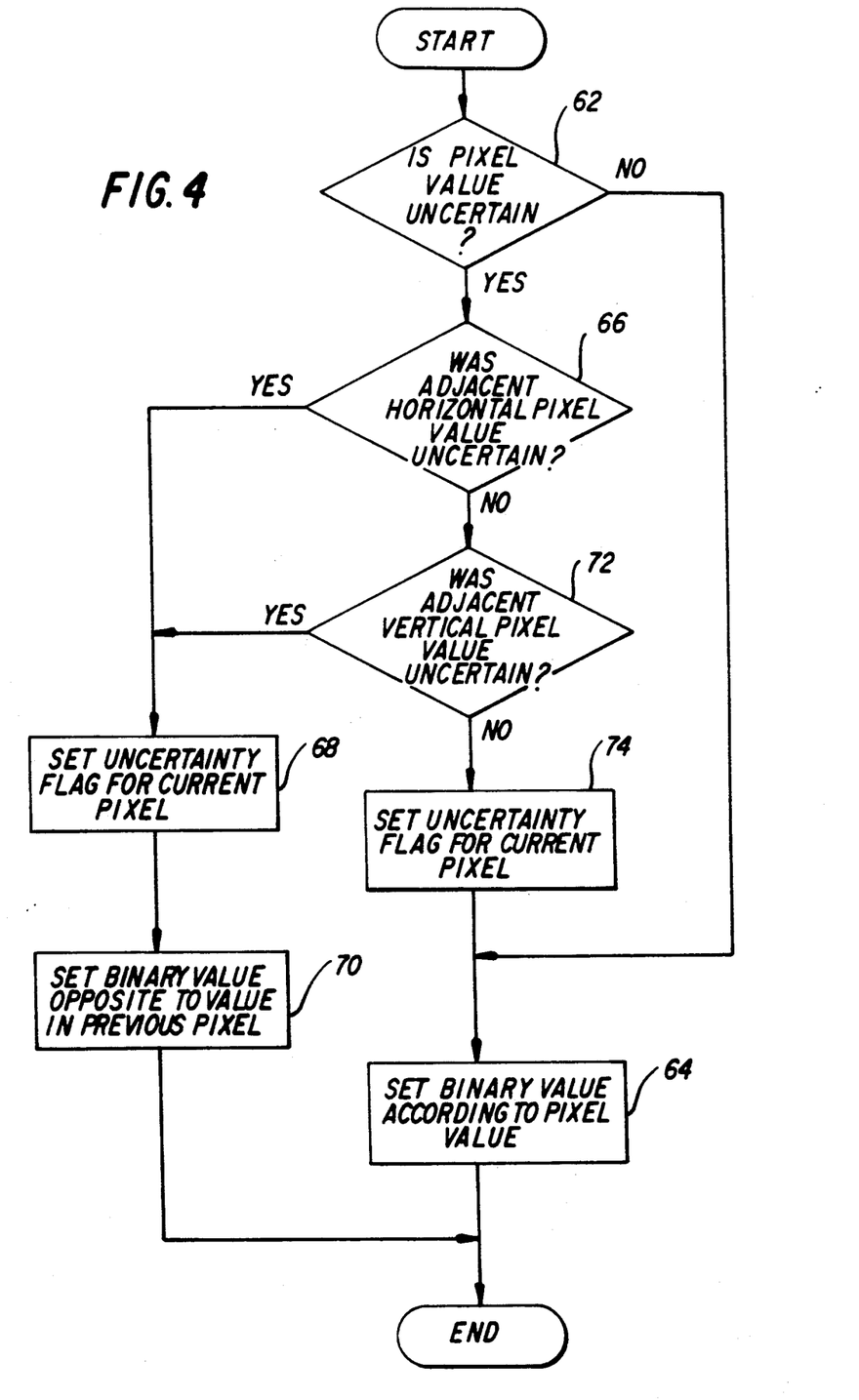
FIG. 4 is a flow chart of a specific processing algorithm.

FIG. 4 is a flow chart of a specific processing algorithm used by the invention to determine the binary value to assign to a particular pixel cell in the line buffer. The process shown in FIG. 4 is applied separately to each pixel and, depending upon the status of the current pixel, the previous horizontal or vertical pixel is also tested to determine the binary value. As shown in FIG. 4, step 62 first determines if the digital value corresponding to the current pixel is certain or uncertain. If the value is certain, then process flow is diverted to block or step 64 which sets the binary value for the current pixel according to the certain determination made by the thresholder. If the step 62 determines an uncertain signal, the process flow continues to step 66 which determines whether the adjacent horizontal pixel, previously analyzed, was defined by a certain or uncertain digital value. If the previous horizontal pixel was defined by an uncertain digital value, the process flow is directed to the step 68 which sets the uncertain flag for the current pixel for use by the processing system when processing the next pixel. Step 70 then sets the binary value for the current pixel being tested or processed to the opposite of the value in the previous horizontal pixel.

In the case where the previous horizontal pixel was certain, the process flow progresses to step 72 which looks at the adjacent and previous vertical pixel to determine whether it was defined by an uncertain digital value. If it was, the process flow is routed through steps 68 and 70 to set the uncertainty flag and to set the binary value opposite to that of the vertical pixel. On the other hand, if the vertical pixel was certain, the process flow progresses to step 74 which sets the uncertainty flag for the current pixel, for future use, and also sets the binary value for the current pixel according to whether the uncertain value is above or below a predetermined threshold value. A more quantitative analysis of the digital values needed to determine a specific binary value is included herein in connection with some of the other figures of the drawings.

Figure 5:
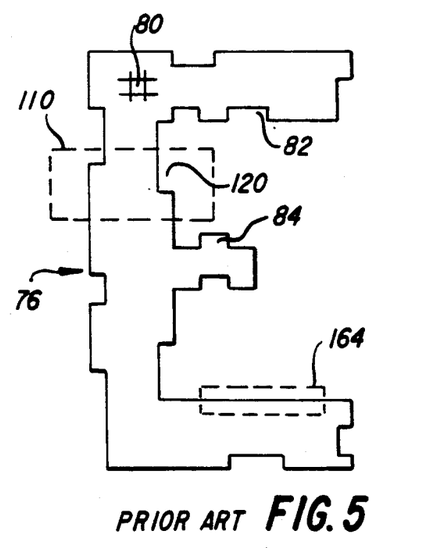
FIG. 5 illustrates a text character produced by a prior art thresholding technique.

FIG. 5 illustrates a text character which could be produced from data processed by a prior art thresholding technique. The "E" character 76 is formed from the binary pixels converted and stored in memory according to the prior art. The square 80 depicts the size of a single pixel. Thus, the character lines are between three and five pixels in width. The printed pixels, such as the pixel printed in square 80, define all of the text or line area of the character which is located within the border or boundaries which outline the character's shape. The portion outside the text area is the background area and does not contain printed pixels.

As can be seen in FIG. 5, the edges of the "E" character 76 are not uniform or smooth and contain gaps, such as gap 82, of several pixels in a row. Some of the pixels extend from the edge to give the appearance of protrusions, such as protrusion 84. The size of these gaps is sufficient in many cases to be noticeable in the finished image and even the spreading effect of fused toner will not usually diminish these objectionable voids or protrusions.

Figure 6:
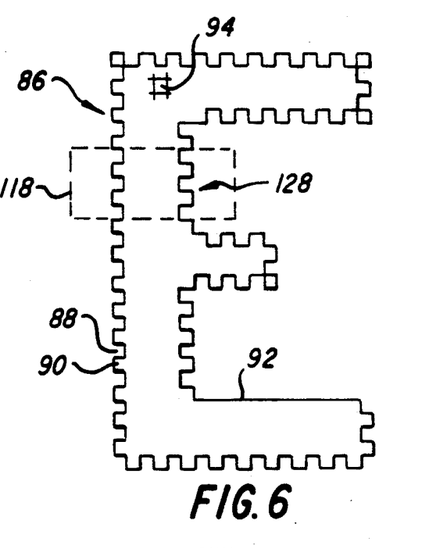
FIG. 6 illustrates the same text character produced by the thresholding system of this invention.

FIG. 6 illustrates an "E" character 86 which would be constructed from data processed according to this invention. As can be seen in FIG. 6, the edges of the data are formed differently from the edges of the character shown in FIG. 5. In FIG. 6, the edges of the character 86 are mostly defined by pixels which have been specified with opposite binary values at adjacent locations. In other words, the pixel defining the gap 88 has been assigned the opposite value as the pixel defining the protrusion 90. It should be apparent from observing FIG. 6 that the edges of the character 86 alternate in binary value at a much higher frequency than the edges of the characters shown in FIG. 5. Because of this high spatial frequency and the small amount of spacing between adjacent and protruding pixels, the edges of the character appear, to an observer at ordinary distance and magnification, as smoother than the edges shown for the character in FIG. 5.

When processed further by the electrophotographic print engine, the toner particles defining the printed pixels tend to blend together and reduce the significance of the gaps in the character edges, thereby also increasing the apparent smoothness of the character edges when formed according to FIG. 6. Fourier analysis of these structured patterns supports the fact that the edges produced by the teachings of this invention, as shown in FIG. 6, are less responsive visually to the eye than the edges of characters produced according to the prior art, as shown in FIG. 5. In areas where the border or boundary of the character would be defined ordinarily by a smooth line, such as line or edge 92 for character 86, the sharpness of the line is undisturbed by the processing system of this invention, as shown in FIG. 6. The sharp edge 92 occurs when the scanning is sufficiently in phase with the borders of the character such that the transition from background to text lines or text areas occurs with digital values above and below the character edge being substantially different. Square 94 indicates the relative size of a single pixel in character 86.

Figure 7:
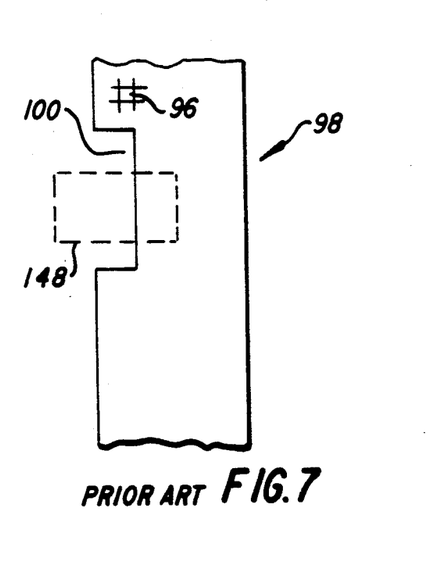
FIG. 7 illustrates a portion of a text character or line produced by a prior art thresholding technique.

FIG. 7 is a portion of a text character, or graphics line, produced by a prior art thresholding technique. The square 96 represents the size of a single pixel in the text portion 98 shown in FIG. 7. In this example, the gap 100 is several pixels wide and three pixels deep. This is representative of a condition which can occur according to the prior art thresholding technique, since the border area or boundary region of the edge of a text character can be more than one pixel wide. As with FIG. 5, the gap 100 shown in FIG. 7 is also very noticeable under normal conditions in the finished printed character.

Figure 8:
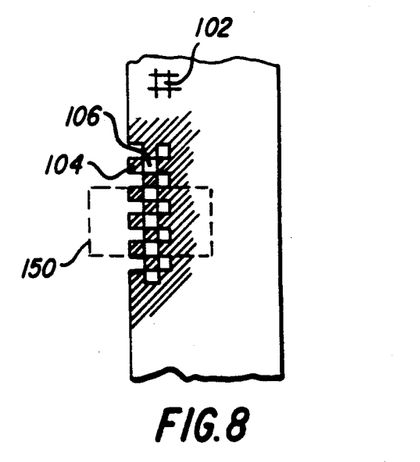
FIG. 8 illustrates the same portion of the text character produced by the thresholding system of this invention.

FIG. 8 illustrates how the thresholding technique of this invention converts the pixels in the gap and effectively fills in the gap so that it is less noticeable to an observer than the gap 100 shown in FIG. 7. The square 102 in FIG. 8 indicates the size of a single pixel. As can be seen in FIG. 8, the gap was filled in by alternating pixels in the gap area defined by lines three and ten pixels long. Therefore, the binary value of the pixel 104 is opposite to that stored for the binary value of pixel 106, and these binary values are determined from the same data which defined the large three-by-ten pixel gap 100 shown in FIG. 7.

FIG. 8 illustrates that the invention is useful for filling in large gaps which would be created by normal thresholding techniques. It should be appreciated, from the previous discussions of the way the thresholding technique of this invention functions, that any size area will be filled in with alternating pixels as shown in FIG. 8, as long as the digital values for these pixels are within an uncertain region near a predetermined threshold value. This makes the processing technique of this invention also applicable to continuous-tone and half-tone pictures wherein ordinary thresholding techniques which use a threshold value to determine the binary values may leave a lot of information out of the converted data. The technique of this invention effectively adds a third level to a binary conversion of a continuous-tone or half-tone picture by alternating the pixel values in the uncertain areas of the pictures. Thus, the binary converted picture appears to have three density levels of printed or displayed areas.

Figure 9:
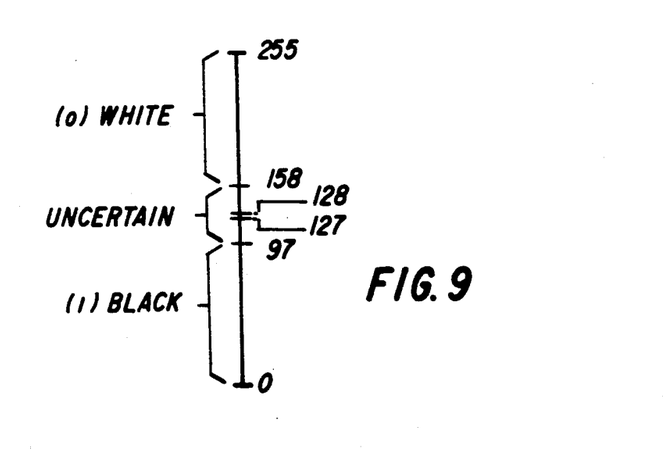
FIG. 9 is a graph illustrating an example of various thresholding ranges used in this specific embodiment of the invention.

FIG. 9 is a graph or diagram illustrating the various threshold values used in this specific embodiment of the invention. Although other values may be used, the values in FIG. 9 are representative of values which could be used to implement the invention. According to FIG. 9, the digital values range from a low of zero to a high of 255, which represents the case where the digital values is defined by an eight-bit digital number. In normal prior art thresholding systems, changing the digital values to two binary values would normally involve determining when the digital value within the overall range is either above or below a predetermined threshold value. The threshold value indicated in FIG. 9 is between 127 and 128. With this simple thresholding technique, any digital value between 128 and 255 would be assigned one binary value, and any value between zero and 127 would be assigned the other binary value. The invention uses a third or "uncertain" range which extends above and below the threshold value by a predetermined distance, with the exact distance, or number of values, depending upon the particular equipment and desired results. In effect, the three ranges define the areas the pixels represent. Thus, pixels in the white range are regarded as representing background areas, pixels in the black range are regarded as representing text or line areas, and pixels in the uncertain range are regarded as representing the border or boundary areas.

In FIG. 9, the uncertain range is between digital values 97 and 158, which are 30 values above and below the threshold value. Thus, according to this invention, whenever a digital value is below 98, the pixel is assigned the binary value of "1" to indicate that it will be printed as a black pixel. On the other hand, any digital value above 157 will be assigned the binary value of zero to indicate that the printed pixel will be left white. Whenever the digital value is 98, 157, or any value therebetween, it is within the uncertain range and further processing and testing of previous pixels is necessary to determine the binary value to be set for a particular pixel, as discussed in more detail elsewhere in this description.

Figure 10:
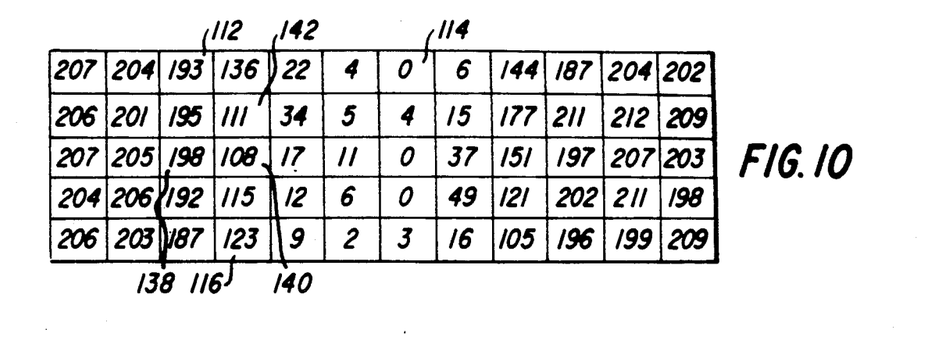
FIG. 10 is a table illustrating values of scanned digital data for a portion of the character shown in FIG. 5.

FIG. 10 is a table illustrating values of scanned digital data for an area corresponding to the area 110 shown in FIG. 5. The values indicated in FIG. 10 are for each of the pixels within the area 110 of FIG. 5 and are the digital values, between zero and 255, which are derived from the scanning system. As can be seen from FIG. 10, some of the pixel values are definitely or certainly in the upper or white range, such as pixel 112 which has a value of 193. On the other hand, pixel 114 contains the value zero which indicates that this pixel certainly will be assigned the binary value corresponding to the lower or black range. Further, some pixels, such as pixel 116, have digital values which are in the uncertain range according to the graph shown in FIG. 9. Therefore, pixel 116 and similar pixels receive further processing before the correct binary value for conversion can be determined.

Figure 11:
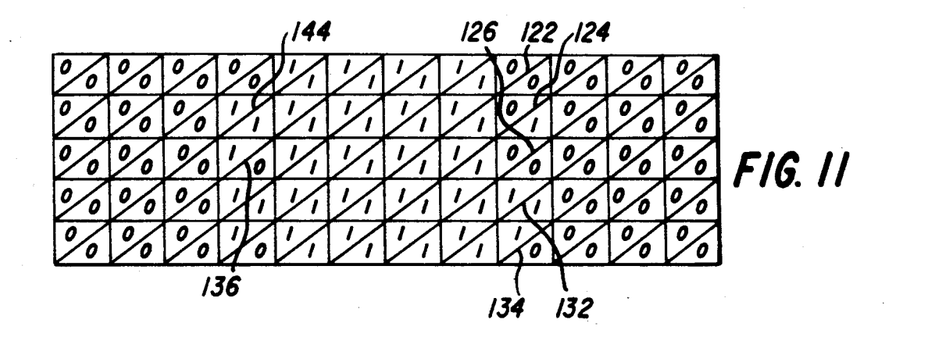
FIG. 11 is a table illustrating binary values converted from the data in FIG. 10.

FIG. 11 is a table indicating the binary values to which the digital values of FIG. 10 are converted according to both the prior art techniques and to the techniques taught by this invention. The binary values above the diagonal lines for each pixel are determined by the prior art technique and correspond to the area 110 shown in FIG. 5. The binary values below the diagonals for each pixel in FIG. 11 are determined by the system of this invention and correspond to the area 118 shown in FIG. 6. by comparing the binary values above and below the diagonals in FIG. 11, it can be seen how the different character patterns produced in FIGS. 5 and 6 are defined by the binary values.

The binary values shown in FIG. 11 above the diagonal lines are formed strictly from a simple thresholding technique. In other words, any digital value in Table 10 between and including 128 and 255 is represented by "0", and any digital value between and including zero and 127 is represented by "1" in FIG. 11. This produces the large gap 120, as shown in FIG. 5 and as defined partially by the zero binary values assigned above the diagonal to pixels 122, 124 and 126. On the other hand, the edge 128 of the character shown in FIG. 6 is defined by alternating pixels, as indicated in FIG. 6 is defined by alternating pixels, as indicated in FIG. 11 by the binary values below the diagonal lines for pixels 122, 124, 126, 132 and 134.

Pixel 136 in FIG. 11 indicates that the binary values assigned to this pixel are different depending upon whether the prior art thresholding technique of the thresholding technique of this invention was used. The binary "1", determined by the prior art concept, it based strictly upon the digital value 108, shown in FIG. 10, which is below the threshold value of 127, and is assigned the binary number or values "1". According to this invention, this pixel value is within the uncertain range between 97 and 158. Thus, it is further processed to determine whether a binary "0" or "1" will be specified for this pixel.

In accordance with this invention, the previous horizontal pixel 138 shown in FIG. 10 has a digital value of 198. This is in the certain range for a binary "0" and, according to the technique of this invention, does not conclusively determine the binary value for the current pixel 136 in FIG. 11 (pixel 140 in FIG. 10). Therefore, this invention looks at the adjacent vertical pixel 142 which has a digital value of 111. Since the value of 111 is within the uncertain range, the pixel 142 will influence the binary value specified for pixel 140. Since pixel 142 was previously specified as a binary "1", as shown in FIG. 11 at pixel location 144, and since this pixel was in the uncertain range, the binary value for pixel 136 is selected to have the opposite binary value, or a binary "0". By similar analysis for all of the pixels within area 118 of FIG. 6, the binary values illustrated in FIG. 11 below the diagonal lines can be determined.

Figure 12:
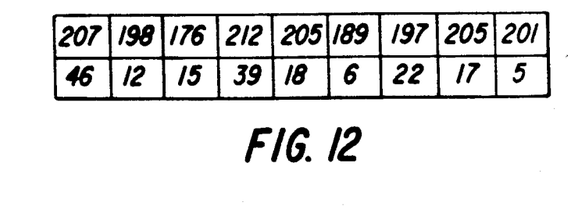
FIG. 12 is a table illustrating values of scanned digital data for another portion of the character shown in FIG. 5.

FIG. 12 is a table illustrating digital values for the area 164 shown in FIG. 5. As can be seen in FIG. 12, the digital values for the pixels above the text boundary are definitely in the white range and the digital values below the text boundary are definitely or certainly in the black range. Therefore, there being no uncertain range within this block of digital values, the processing technique of the invention yields the same pixel pattern as the prior art processing technique, thereby preserving the straight edge defined by the digital values and shown by edge 92 in FIG. 6. Therefore, whenever the data scanned is sufficiently certain to define a precise text edge, the processing technique of this invention does not disturb that edge and leaves the smooth pixel arrangement intact.

Figure 13:
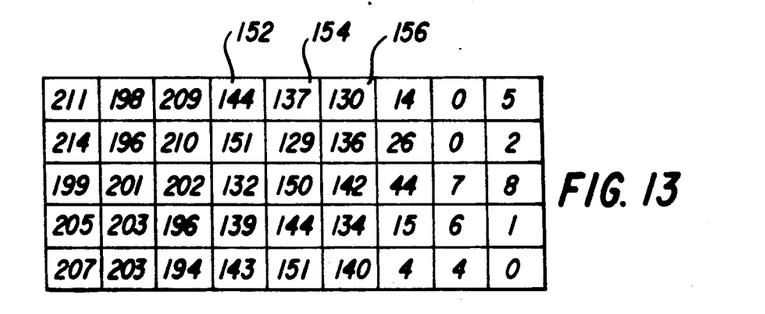
FIG. 13 is a table illustrating values of scanned digital data for a portion of the character shown in FIG. 7.
Figure 14:
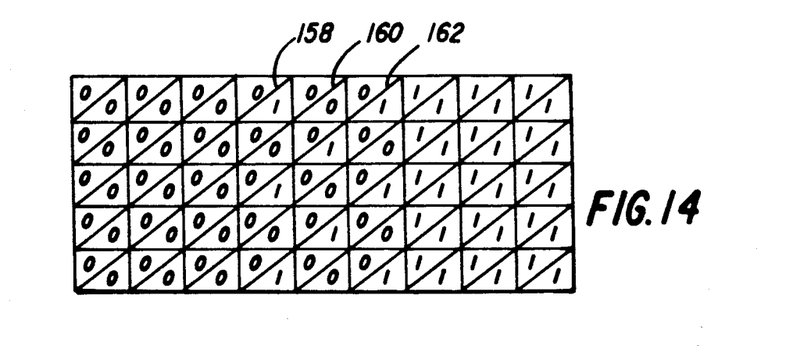
FIG. 14 is a table illustrating binary values converted from the data in FIG. 13.

FIG. 13 is a table indicating the digital values scanned for the character data corresponding to the area 148 shown in FIG. 7. FIG. 14, on the other hand, represents the binary data to which the diagonals representing the binary data for the area 148, and the binary data below the diagonals corresponding to the area 150 shown in FIG. 8. The analysis between FIG. 13 and FIG. 14 is similar to the analysis between FIG. 10 and FIG. 11. The major difference is the fact that a larger number of adjacent pixels represented by digital data in FIG. 13 are within the uncertain range between 97 and 158. This is illustrated by pixels 152, 154 and 156 in FIG. 13. However, by applying the same processing technique as used in this invention to produce the character shown in FIG. 6, the binary values indicated below the diagonals in FIG. 14 are produced. Consequently, the binary values below the diagonals for pixels 158, 160 and 162 illustrate the alternating binary pattern produced by the processing of this invention and shown within the area 150 of FIG. 8.

The techniques used by this invention are most beneficial when the pixel resolution is such that the serrated edge produced by the processing is sufficiently fine to be substantially unnoticeable by an observer on normal output copies. This occurs when the line resolution is at least 133 lines per inch, or 266 dpi. At line resolutions below 133, the serrated edges are still noticeable under ordinary conditions and the benefits of the invention are not fully realized.

The invention disclosed herein provides a convenient and easily implemented way of enhancing the appearance of text characters and, in some cases, half-tone and continuous-tone pictoral information. It is emphasized that numerous changes may be made in the above-described system without departing from the teachings of the invention. It is intended that all of the matter contained in the foregoing description, or shown in the accompanying drawings, shall be interpreted as illustrative rather than limiting.

We claim as our invention:

1. A system for processing gray level digital pixel information and converting the pixel information into binary data suitable for use by a binary output device, said system comprising:

threshold means for receiving a signal representing a current digital pixel value and in response thereto generating either (a) a first signal representing a current pixel as binary "1" and thereby determining said value as being within a first range of values or (b) generating a second signal representing said current pixel as binary "0" and thereby determining said value as being within a third range of values or (c) generating a third signal determining said value for said current pixel as being within a second range intermediate said first and third ranges; and processing means coupled to said threshold means and responsive to said third signal for generating a signal representing said current pixel as a binary "1" when a signal representing the digital pixel value of an adjacent pixel was determined to be within the second range and in response thereto a signal representing binary "0" was generated for said adjacent pixel.

2. The processing system of claim 1 and wherein the processing means includes means for generating a signal representing binary "0" when a signal representing the digital pixel value of the adjacent pixel was determined to be within the second range and in response thereto a signal representing binary "1" was generated for said adjacent pixel.

3. The processing system of claim 1 and wherein the processing means includes means for first testing a signal representing the digital pixel value of the adjacent horizontal pixel and, if it is not determined to be within the second range, next testing a signal representing the digital pixel value of the adjacent vertical pixel to determine if it is within the second range.

4. The processing system of claim 1 and wherein the processing means includes means for generating a signal representing one binary value when the current digital pixel value is above a predetermined threshold and a different signal representing a different binary value when the current digital pixel value is below a predetermined threshold where the current digital pixel value is determined to be within the second range of values and the digital pixel values of at least two pixels adjacent said current pixel were determined not to be within the second range.

5. The processing system of claim 4 and wherein the processing means includes means for first testing a signal representing the digital pixel value of the adjacent horizontal pixel and, if it is not determined to be within the second range, next testing a signal representing the digital pixel value of the adjacent vertical pixel to determine if it is within the second range.

6. The processing system of claim 1 and wherein the processing means includes means for first testing a signal representing the digital pixel value of the adjacent horizontal pixel and, if it is not determined to be within the second range, next testing a signal representing the digital pixel value of the adjacent vertical pixel to determine if it is within the second range.

7. A system for processing gray level digital pixel information and converting the pixel information into binary data suitable for use by a binary output device, said system comprising:
   first means for converting signals representing multibit digital values to binary values for pixels which represent the inner portions of text characters and for pixels which represent the background areas outside the characters;
   means for determining when signals representing multibit digital values are for pixels which are at the boundaries of characters and background areas; and
   second means for converting signals representing multibit digital values to binary values for the determined boundary pixels, said second means effectively alternating the binary values of the majority of the adjacent pixels which define the boundary, thereby causing the binary data to define characters having serrated edges.

8. A method for processing gray level digital pixel information and converting the pixel information into two-valued binary data suitable for use by a binary output device, said method including the steps of:
   determining whether a multibit digital signal being processed represents a portion of a background area, text area, or text-background boundary;
   in response to a determination that the multibit digital signal being processed represents a portion of a text background boundary converting the digital signal into a signal of one binary value if it represents a background area;
   converting the digital signal into a signal of the other binary value if it represents a text area;
   obtaining conversion information about an adjacent processed pixel; and
   converting the digital signal into a signal of the binary value which is opposite to that of said adjacent processed pixel when the adjacent processed pixel represents a portion of a text-background boundary.

9. The method of claim 8 and wherein the data is printed and then the data is developed with toner.

10. The method of claim 9 wherein optical information is scanned from a document and converted to electrical signals.

11. A method for processing gray level digital pixel information and converting the pixel information into two-valued binary data suitable for use by a binary output device, said method including the steps of:
    determining whether a multibit digital signal being processed represents a portion of a background area, text area or text-background boundary;
    converting the digital signal into a signal of one binary value if it represents background area;
    obtaining conversion information about a previously processed pixel; and
    converting the digital signal when it represents a boundary into one of two binary values, with adjacent pixels along the boundary converted to a series of alternating binary values to purposely introduce a fine serrated edge at most of the boundaries of the text characters defined by the binary data.

12. The method of claim 11 and wherein the data is printed and then the data is developed with toner.

13. The method of claim 12 wherein optical information is scanned from a document and converted to electrical signals.

14. The processing method of claim 11 wherein the size of pixels printed by said output device is small enough to provide a line resolution of at least 133 lines per inch.

15. The method of claim 14 and wherein the data is printed and then the data is developed with toner.

16. The method of claim 15 wherein optical information is scanned from a document and converted to electrical signals.

17. A method for processing gray level digital pixel information from an electronic scanner and converting the pixel information into two-valued binary data suitable for use by a binary output device, said method including the steps of:
    determining whether a multibit signal having a digital pixel value representing a current pixel being processed represents a first certain range of digital pixel values, a second certain range of digital pixel values, or an uncertain range of digital pixel values which is intermediate the first and the second certain ranges;
    converting the digital pixel value into a signal of one binary value if it is within the first certain range;
    converting the digital pixel value into a signal of the other binary value if it is within the second certain range; and in response to a determination made for a previously processed pixel,
    converting the digital pixel value of the current pixel, when it is within the uncertain range into a signal of the opposite binary value to that of the previously processed pixel when the digital pixel value of the previously processed pixel was also within the uncertain range.

18. The method of claim 17 and wherein the data is printed and then the data is developed with toner.

19. The method of claim 18 wherein optical information is scanned from a document and converted to electrical signals.

20. The processing method of claim 17 including the step of:
    converting the digital pixel value of the current pixel when it is within the uncertain range into a binary value depending upon whether the digital value of the current pixel is above or below a threshold value after determining that at least two adjacent previous pixels had respective digital pixel values that were not within the uncertain range.

21. The method of claim 20 and wherein the data is printed and then the data is developed with toner.

22. The method of claim 21 wherein optical information is scanned from a document and converted to electrical signals.

23. A method of converting gray level digital pixel information signals into binary data signals, said method including the steps of:
locating regions where pixels are each represented by multibit signals having digital pixel values which are within a middle range of possible digial pixel values, the middle range being between an upper and lower range of possible digital pixel values; and
converting the digital values of pixels in said regions to signals having binary values which provide a pixel pattern of alternating binary values in each of said regions.

24. The method of claim 23 and wherein the data is printed and then the data is developed with toner.

25. The method of claim 24 wherein optical information is scanned from a document and converted to electrical signals.

* * * * *